United States Patent [19]

Short et al.

[11] 3,757,881

[45] Sept. 11, 1973

[54] CRANE CRAWLER TRUCK

[75] Inventors: Ralph H. Short; Paul C. Goodwine, both of Lima, Ohio

[73] Assignee: Clark Equipment Company, Buchanan, Mich.

[22] Filed: Dec. 23, 1971

[21] Appl. No.: 211,505

[52] U.S. Cl. .............................. 180/9.2, 180/9.48
[51] Int. Cl. ............................................ B62d 55/08
[58] Field of Search ...................... 280/34 R, 34 A; 180/9.48, 9.2, 6.7, 6.48

[56] References Cited
UNITED STATES PATENTS

| | | | |
|---|---|---|---|
| 1,319,235 | 10/1919 | Messersmith | 280/34 R |
| 2,229,653 | 1/1941 | Hohl | 280/34 R |
| 3,439,425 | 4/1969 | Doxey | 180/9.2 R X |
| 3,494,439 | 2/1970 | Kline | 180/9.48 X |
| 3,036,650 | 5/1962 | Cimino | 180/9.2 R |
| 3,154,164 | 10/1964 | Shaw | 280/34 R X |

FOREIGN PATENTS OR APPLICATIONS

| | | | |
|---|---|---|---|
| 647,871 | 10/1962 | Italy | 180/9.48 |

*Primary Examiner*—Richard J. Johnson
*Attorney*—Kenneth C. Witt, Lewis J. Lamm et al.

[57] ABSTRACT

This is a vehicle having detachable self-propelled track laying traction devices which may be detachably mounted on opposite sides or opposite ends of a rectilinear base or chassis of the vehicle. The crawler type traction apparatus is mounted on the sides of the rectilinear chassis to give a narrow tread width to give maximum maneuverability for working within a narrow area. The traction apparatus may be mounted on the ends of the chassis to obtain a wide tread width and thereby give maximum stability.

3 Claims, 4 Drawing Figures

3,757,881

CRANE CRAWLER TRUCK

BACKGROUND OF THE INVENTION

The tread width of self-propelled vehicles must normally be a compromise between a narrow width desirable for manueverability and for working in narrow areas, and a wide width desirable to promote stability and to permit straddling of trenches and other like longitudinal obstructions.

Previous track laying devices have attempted to obtain maneuverability plus stability by extending the tread width using detachable track extensions. While this aids in obtaining stability, it results in the necessity to provide and maintain supplemental tracks with resultant inconvenience and expense. The prior art has also utilized adjustable tread width means to obtain a wide track stance and thus increase stability. Providing a vehicle with adjustable tread width means is quite expensive and requires additional maintenance.

The most popular means of providing stability while maintaining a narrow tread width is to use outriggers. This method is quite satisfactory when the vehicle requires stability only when in a stationary position but it seriously limits mobility with stability.

SUMMARY OF THE INVENTION

The present invention relates to material handling vehicles, particularly those of the crane, drag line, shovel etc. type, and specifically relates to a method and means of providing such vehicles with selective tread widths.

In the present invention, self-contained long crawler type traction devices are provided with means for alternately mounting the devices on the sides and the ends of a rectilinear base of a vehicle. The mounting of the crawlers on the sides of the base gives a narrow tread width permitting the maximum of maneuverability of the vehicle. The mounting of the crawlers on the ends of the rectilinear base gives a maximum of tread width and thereby gives a maximum of stability to the vehicle.

The mounting of the crawler assembly to the rectilinear base is facilitated by providing on each crawler assembly two large pin devices and providing on each side and end of the base mating holes in which these pins fit and may be locked. Energy transmitting means in the forms of hydraulic and air lines connect the hydraulic motors and air brakes in the crawler assembly to sources of high pressure hydraulic fluid and air, respectively. A control mechanism may be located on the vehicle cab to permit control of the crawlers from the cab.

This provision of alternate tread widths permits the utilization of a narrow tread width for maximum maneuverability such as is needed for moving the vehicle over the road or between jobs and the utilization of a wide tread width while the vehicle is being utilized in an environment where stability is paramount to maneuverability.

The providing of simple and rapid mechanical and hydraulic connections between the base of the superstructure and the crawler assembly permits the rapid changing of the tread width as desired.

It is an object of the present invention to provide selective alternate tread widths for a material handling vehicle.

It is another object of the present invention to provide self-contained crawler traction devices which may be mounted on the sides or ends of a rectilinear base of a vehicle to provide alternate tread widths.

It is another object of the present invention to provide a simple means for improving the maneuverability and stability of vehicles.

Other objects and advantages of the present invention will become apparent from reading the detailed description in the specification and appended claims.

GENERAL DESCRIPTION OF THE INVENTION

Referring to the figures of the drawing,

FIG. 1 shows the crawler track devices 4 and 6 mounted on the sides of the rectilinear vehicle base 2.

FIG. 2 shows the crawler traction devices 4 and 6 mounted on the ends of the rectilinear vehicle base 2.

FIGS. 3 and 4 show in greater detail one of the crawler traction devices and the method of mounting the long crawler 6 to the rectilinear base 2.

DETAILED DESCRIPTION OF THE PREFERRED EMBODIMENT

Figure 1:
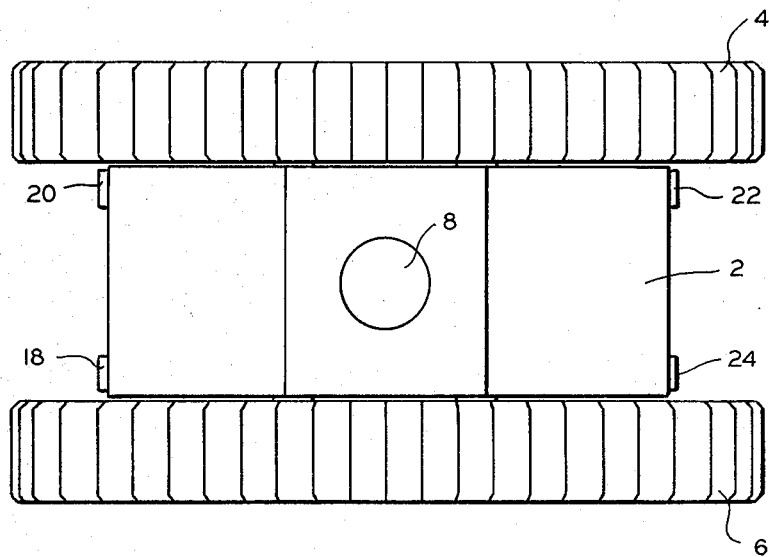
Figure 2:
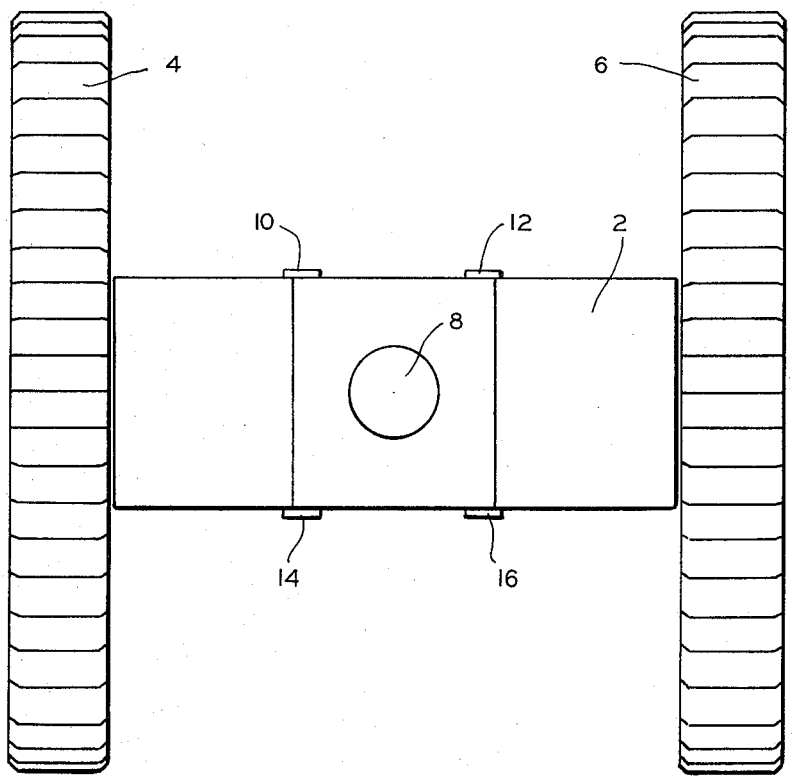

Referring to the FIGS. 1 and 2 of the drawings, the vehicle rectilinear base 2 has a mounting ring 8 for securing a superstructure thereto. The superstructure may be a material handling crane, an earth-moving shovel or like device. This superstructure is not part of the present invention and may be any vehicle body. The rectilinear base has pads 10 and 12 to which the crawler 4 may be mounted as shown in FIG. 1. It also has pads 14 and 16 to which the crawler 6 is mounted. In FIG. 2 the crawlers 4 may be mounted to the pads 18 and 20 while the crawler 6 may be mounted to the pads 22 and 24. The pairs of mounting pads are symmetrically located about the center of the mounting ring 8 and are equal distance from each other so that the crawler 4 and the crawler 6 may be attached to selected sides or ends of the rectilinear vehicle base. The self-contained crawler traction devices are shown mounted to the sides of the rectilinear base in FIG. 1 to give a narrow tread width for maximum maneuverability. These traction devices are shown attached to the ends of the rectilinear base in FIG. 2 to give maximum stability for the vehicle.

Figure 3:
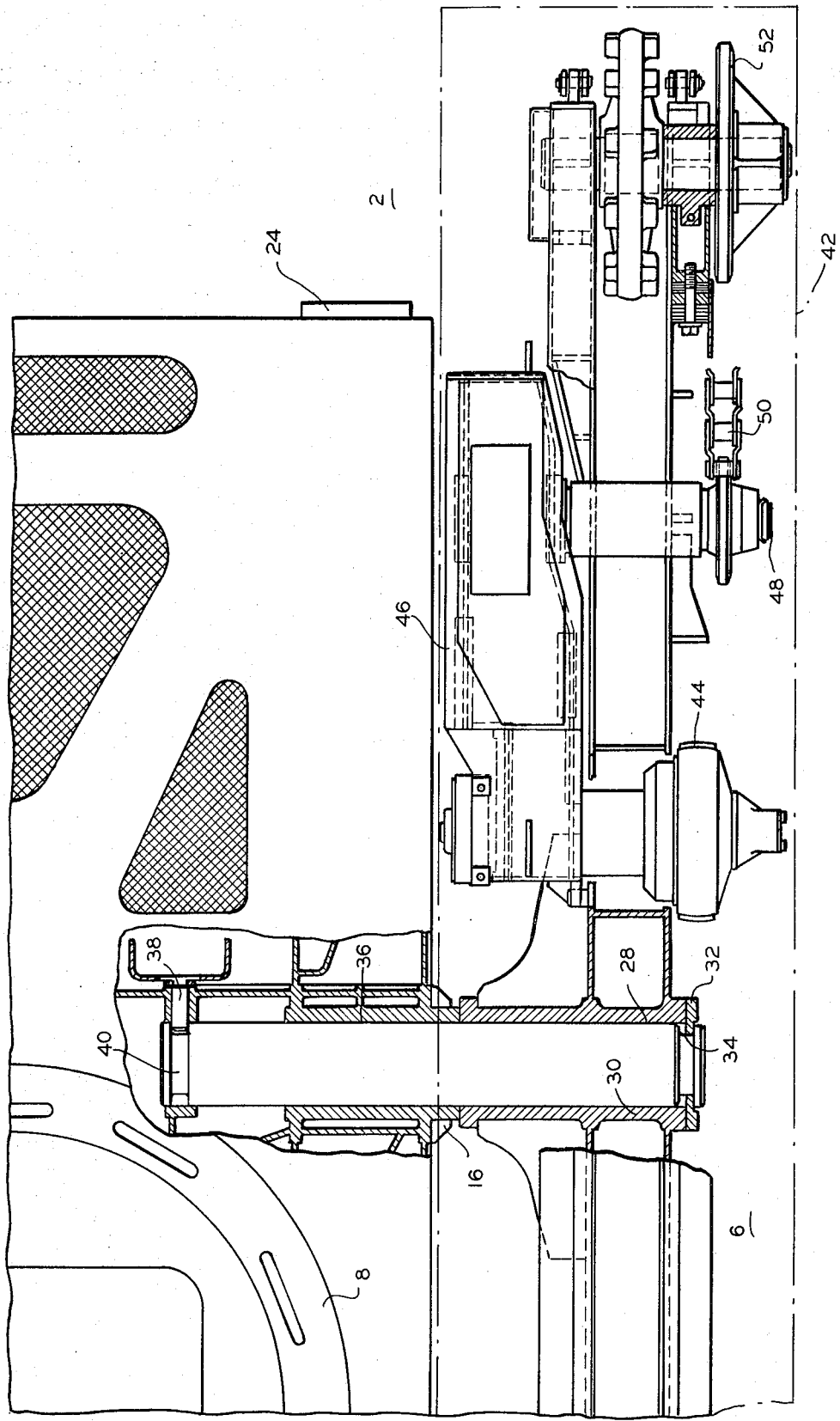
Figure 4:
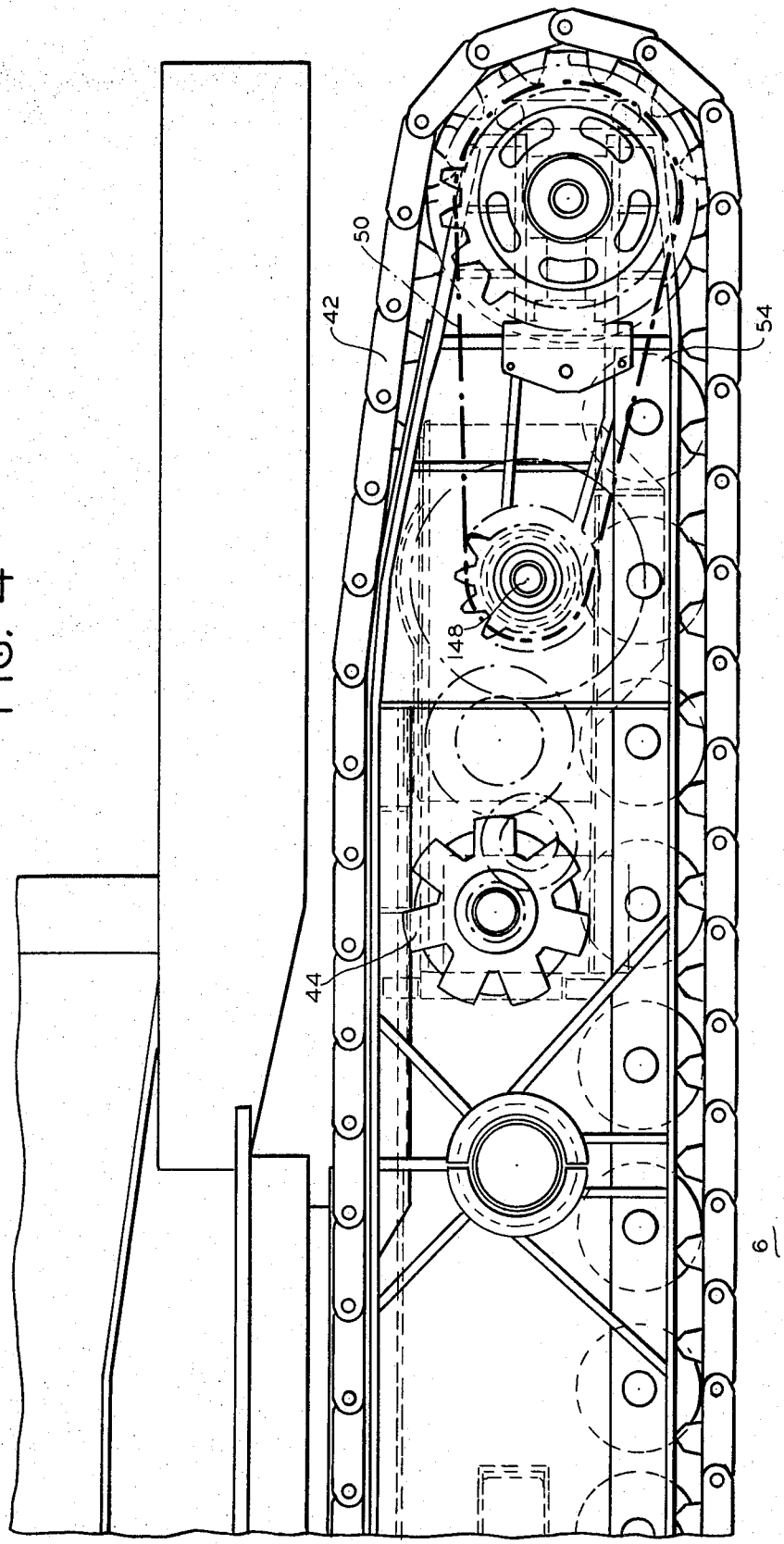

FIGS. 3 and 4 show the vehicle in greater detail. Referring now to FIG. 3, the means for driving the self-contained crawler and the means for attaching this crawler to the vehicle base is shown in greater detail. Each of the self-contained crawlers is attached to the base by a pair of pins. All of these pin attaching means are similar and the attaching means at pad 16 in FIG. 3 will be described in greater detail. The frame of the crawler 6 has a bored cylindrical opening 30 therein and the frame of the base 2 has a mating bored opening 36 therein. A mounting pin 28 fits in these openings and is retained therein by attaching means located at either end. The pin 28 has a groove 34 in its outboard end which mates with a collar arrangement 32 attached to the crawler frame. The inboard end of the pin 28 has a similar groove 40 with a mating pin 38 to prevent its movement with relation to the vehicle base. Identical attaching assemblies are located at pads 10, 12 and 14 when the crawlers are attached to the sides of the base as shown in the figure. These assemblies appear at pads 18, 20, 22 and 24 when the crawlers are attached to the ends of the base.

Each of the crawler assemblies is entirely self-contained and similar in construction. The construction of the crawler assembly 6 will be described as typical. This crawler assembly has a track 42 which is driven by a hydraulic motor 44 through a suitable drive train transmission 46, a cross shaft 48, a drive chain 50 and a sprocket wheel 52. This self-contained crawler assembly also has the normal idler load carrying wheels 54.

The hydraulic motor 44 is connected to a hydraulic fluid source through controls, not shown, in the normal manner. This connection of hydraulic controls plus another connection for an air brake, not shown, together with the mechanical pin connection described above makes the crawler assemblies quickly detachable from the frame of the vehicle.

The preferred embodiment of attaching the crawlers to the vehicle base has been shown and described as has the preferred embodiment of providing motive power for the crawlers.

The invention, however, relates broadly to providing quickly detachable crawlers which may be attached to the sides or ends of a vehicle base to thereby give an optional narrow or wide tread width as desired for operating conditions.

Having thus described the preferred embodiment of the present invention, it will, of course, be understood that various changes may be made in the construction of the crawler assembly, the means for attaching to the rectilinear base, and other changes made in the form, details, arrangement and proportion of the parts without departing from the scope of the invention which consists of the matters shown and described herein and set forth in the appended claims.

We claim:
1. A self-propelled vehicle comprising:
a rectilinear chassis having
  two short ends parallel to each other,
  two long sides parallel to each other,
  each of two short ends and each of two long sides having two cylindrical shaped openings in each of said sides and ends,
a pair of traction devices each including self-contained track laying propelling crawlers and motors mounted within said traction device and operatively connected to said propelling crawlers and mounted within the circuit traveled by the track of said crawlers,
pins mounted on said traction devices capable of fitting said cylindrical shaped openings to thereby attach said traction devices to said chassis,
whereby said traction devices may be alternately mounted on the two short ends of said rectilinear chassis and the two long sides of said chassis to thereby provide support and motivation for said self-propelled vehicle.

2. A self-propelled vehicle as claimed in claim 1 in which:
the motors are hydraulic motors.

3. A self-propelled vehicle as claimed in claim 1 in which:
said pins are detachably mounted to said traction devices and to said cylindrical shaped openings.

* * * * *